(12) United States Patent
Al-Mulhem (10) Patent No.: US 10,513,915 B2
(45) Date of Patent: Dec. 24, 2019

(54) CONSOLIDATED MATERIAL TO EQUALIZE FLUID FLOW INTO A WELLBORE

(71) Applicant: Saudi Arabian Oil Company, Dhahran (SA)

(72) Inventor: Abdulrahman Abdulaziz Al-Mulhem, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 26 days.

(21) Appl. No.: 15/827,262

(22) Filed: Nov. 30, 2017

(65) Prior Publication Data

US 2019/0162059 A1    May 30, 2019

(51) Int. Cl.
| | |
|---|---|
| *E21B 43/12* | (2006.01) |
| *E21B 43/16* | (2006.01) |
| *E21B 43/02* | (2006.01) |
| *C09K 8/56* | (2006.01) |

(52) U.S. Cl.
CPC .............. *E21B 43/12* (2013.01); *C09K 8/56* (2013.01); *E21B 43/025* (2013.01); *E21B 43/16* (2013.01)

(58) Field of Classification Search
CPC ........ E21B 43/12; E21B 43/16; E21B 43/025; C09K 8/56
See application file for complete search history.

(56) References Cited

U.S. PATENT DOCUMENTS

| | | | |
|---|---|---|---|
| 3,489,222 A | 1/1970 | Millhone et al. | |
| 4,903,770 A | 2/1990 | Friedman et al. | |
| 8,613,320 B2 | 12/2013 | Nguyen et al. | |
| 9,222,014 B2 | 12/2015 | Rickman et al. | |
| 2009/0173497 A1* | 7/2009 | Dusterhoft | ............ E21B 43/025 166/276 |
| 2015/0300131 A1 | 10/2015 | Vigderman et al. | |
| 2016/0347987 A1* | 12/2016 | Nguyen | ................ E21B 43/267 |

FOREIGN PATENT DOCUMENTS

WO    2017039691    3/2017

OTHER PUBLICATIONS

International Search Report and Written Opinion issued in International Application No. PCT/US2018/061034 dated Jan. 17, 2019, 14 pages.

* cited by examiner

*Primary Examiner* — Kristyn A Hall
(74) *Attorney, Agent, or Firm* — Fish & Richardson P.C.

(57) ABSTRACT

Methods for equalizing flow into a wellbore using consolidated material are described. An unconsolidated material and a consolidation fluid are flowed into a wellbore formed in a hydrocarbon-bearing subterranean zone, and a permeability of the subterranean zone to flow fluid through the subterranean zone into the wellbore is non-uniform across an axial length of the wellbore. The unconsolidated material and the consolidation fluid are contacted across at least an axial segment of an inner surface of the wellbore, and the unconsolidated material is bound with the consolidated fluid to form a pack, in which the pack has a permeability that is more uniform than the permeability of the subterranean zone. A flow of fluids from the axial segment of the subterranean zone into the wellbore is controlled through the pack.

19 Claims, 6 Drawing Sheets

CONSOLIDATED MATERIAL TO EQUALIZE FLUID FLOW INTO A WELLBORE

TECHNICAL FIELD

This specification relates to equalizing fluid flow into a wellbore penetrating a subterranean formation, using consolidated material, for example, as a flow choking mechanism.

BACKGROUND

Permeability is the ability of a material to transmit fluid. In relation to hydrocarbon recovery, rock permeability is one of the various parameters utilized to characterize a hydrocarbon-bearing reservoir and to predict the reservoir's productivity and profitability. When a single fluid is present in a formation, an absolute permeability can be measured, for example, in millidarcy (mD). When two or more immiscible fluids are present in a formation (as is usually the case), each fluid affects the ability of the other fluids to flow. In such cases, the effective permeability is the ability to preferentially transmit a particular fluid in the presence of other fluids, and the relative permeability is the ratio of the effective permeability of the particular fluid at a certain saturation to the absolute permeability of that fluid at total saturation.

To further complicate hydrocarbon extraction from a reservoir, permeability is not typically distributed uniformly. Rather, rock formations are typically complex, heterogeneous, and anisotropic—that is, rock formations usually have varied geometry and permeability across different locations within the formation. The magnitude of permeability contrast can have significant impact on production. For example, a layer of low permeability can impede the downward movement of hydrocarbon gas, whereas a layer of high permeability can prematurely bring undesired water to a production well (referred to as water breakthrough). Wells can be completed such that the effect of the formation's heterogeneity on production is mitigated. For example, well completions can aim to evenly distribute inflow of fluids.

SUMMARY

The present disclosure describes technologies relating to equalizing flow into a wellbore penetrating a subterranean formation, using consolidated material.

Certain aspects of the subject matter described here can be implemented as a method. An unconsolidated material and a consolidation fluid are flowed into a wellbore formed in a hydrocarbon-bearing subterranean zone, and a permeability of the subterranean zone to flow fluid through the subterranean zone into the wellbore is non-uniform across an axial length of the wellbore. The unconsolidated material and the consolidation fluid are contacted across at least an axial segment of an inner surface of the wellbore, and the unconsolidated material is bound with the consolidation fluid to form a pack, in which the pack has a permeability that is more uniform than the permeability of the subterranean zone. A flow of fluids from the axial segment of the subterranean zone into the wellbore is controlled through the pack.

This, and other aspects, can include one or more of the following features. The consolidation fluid can include a resin and a curing agent.

The unconsolidated material can include sand, ceramic proppants, or combinations of them.

The consolidation fluid can bind the unconsolidated material after contacting the pack across at least the axial segment of the inner surface of the wellbore.

The pack can be contacted with a postflush fluid to increase the permeability of the pack after contacting the pack across at least the axial segment of the inner surface of the wellbore.

The postflush fluid can include an aqueous fluid, a solvent, or combinations of them.

The postflush fluid can include methanol, water, or combinations of them.

The pack can be left to harden for substantially 48 hours or less after contacting the pack with the postflush fluid.

The permeability of the pack after contacting the pack with the postflush fluid can be substantially 80% or less of a permeability of the unconsolidated material.

Certain aspects of the subject matter described here can be implemented as a method for completing a well. An unconsolidated material is flowed into a wellbore formed in a hydrocarbon-bearing subterranean zone, in which a permeability of the subterranean zone to flow fluid through the subterranean zone into the wellbore varies across an axial length of the wellbore; a consolidation fluid is flowed into the wellbore; the unconsolidated material is at least partially consolidated within the wellbore using the consolidating fluid to form an at least partially consolidated material having a permeability that is different from the permeability of the subterranean zone, in which the at least partially consolidated material coats an inner wall of an axial segment of the wellbore; and a flow of fluids from the axial segment of the subterranean zone into the wellbore is controlled through the at least partially consolidated material.

This, and other aspects, can include one or more of the following features. The consolidation fluid can include a resin and a curing agent.

The unconsolidated material can include sand, ceramic proppants, or combinations of them.

The consolidation fluid and the unconsolidated material can be flowed together into the wellbore.

The consolidation fluid can be flowed into the wellbore after flowing the unconsolidated material into the wellbore.

The at least partially consolidated material can be contacted with a postflush fluid to increase the permeability of the at least partially consolidated material.

The postflush fluid can include an aqueous fluid, a solvent, or combinations of them.

The postflush fluid can include methanol, water, or combinations of them.

The at least partially consolidated material can be contacted with the postflush fluid to increase permeability, and the at least partially consolidated material can be left to harden for substantially 48 hours or less.

The permeability of the at least partially consolidated material after contacting the at least partially consolidated material with the postflush fluid can be substantially 80% or less of a permeability of the unconsolidated material.

The details of one or more implementations of the subject matter of this specification are set forth in the accompanying drawings and the description. Other features, aspects, and advantages of the subject matter will become apparent from the description, the drawings, and the claims.

DETAILED DESCRIPTION

A subterranean zone—which can be a formation, a portion of a formation, or multiple formations in a hydrocarbon-bearing reservoir—can have varied or heterogeneous permeability (that is, the permeability can be different across various areas of the subterranean zone). Levels of permeability (for example, high, moderate, and low) can be defined on a basis of both the permeability of the formation and the viscosity of the fluid being produced. For example, in the case of a gas well with an average viscosity of 0.02 centipoise (cP) of hydrocarbon gas, a permeability of 0.1 millidarcy (mD) or less can be considered low, a permeability between 1 mD and 10 mD can be considered moderate, and a permeability greater than 25 mD can be considered high. As another example, in the case of an oil well with an average viscosity of 2 cP of hydrocarbon oil, a permeability of 10 mD or less can be considered low, a permeability between 100 mD and 1,000 mD can be considered moderate, and a permeability greater than 2,500 mD can be considered high. Carbonate reservoirs typically have a high degree of fracturing and permeability variation. In some cases, heterogeneous reservoirs have thin stratigraphic sequences of high permeability, while the rest of the formation has low permeability. The thin stratigraphic sequences of high permeability are also known as high permeability streaks. For a wellbore formed in a subterranean zone, heterogeneous permeability and the presence of high permeability streaks can cause the flow distribution (or inflow profile) along the length of the wellbore to be non-uniform. An uneven fluid flow distribution into a well installed in such a wellbore can cause various production issues. For example, uneven inflow profiles can lead to (and accelerate) water or gas coning and subsequent breakthrough, which can possibly prematurely end the well's productive life and leave valuable hydrocarbons unrecovered from the subterranean zone. Inflow control devices (ICDs) are pieces of passive, permanent hardware that can be installed at various points along a well to partially choke flow (that is, provide additional pressure drop) for the purpose of achieving a more uniform flow distribution of fluids into the wellbore. ICDs can be, for example, nozzles, orifices, tubes, or helical channels and can be expensive to purchase and install.

Sometimes, consolidated material, for example, consolidated sand or other consolidated material, can be used as an alternative to ICDs. Consolidated material can be more cost effective than conventional ICDs, as consolidated material can be installed without the need of a rig, and the base material of consolidated material can be less expensive than those for ICDs. In some cases, consolidated material can be more durable than ICDs. Consolidated material can also be chemically altered, for example, the consolidated material can be treated to increase or decrease the permeability of the consolidated material in cases where well conditions change.

This disclosure describes technologies relating to creating a layer of consolidated material with uniform permeability within a wellbore for the purpose of controlling fluid flow into the wellbore. In other words, the consolidated material can serve a similar function as inflow control devices and can therefore replace inflow control devices. In this specification, "uniform" means having a ratio of a maximum value to a minimum value less than 5. For example, if a portion of material has a minimum permeability of 100 millidarcy (mD) and a maximum permeability of 400 mD (ratio of maximum to minimum is 4), then the portion of material can be considered to have uniform permeability. Conversely, if a portion of material has a minimum permeability of 200 mD and a maximum permeability of 1,100 mD (ratio of maximum to minimum is 5.5), then that portion of material can be considered to have a non-uniform permeability. Additionally, in a comparison, "more uniform" means having a ratio of a maximum value to a minimum value closer to 1. For example, if a portion of a first material has a minimum permeability of 100 mD and a maximum permeability of 200 mD (ratio of maximum to minimum of 2), and a portion of a second material has a minimum permeability of 250 mD and a maximum permeability of 750 mD (ratio of maximum to minimum of 3), then the portion of the first material can be considered to have a more uniform permeability than the portion of the second material. By implementing the techniques described here, the effects of high permeability streaks or fractures in a subterranean zone can be mitigated or eliminated. The fluid flow into a wellbore formed in a subterranean zone can be equalized, and the equalized flow distribution can delay water breakthrough and prematurely ending production. In some cases, the consolidation treatment of the subterranean zone introduces material into an annulus between completion tubing and the inner surface of a wellbore, such that drill out after material consolidation is not required.

Figure 1A:
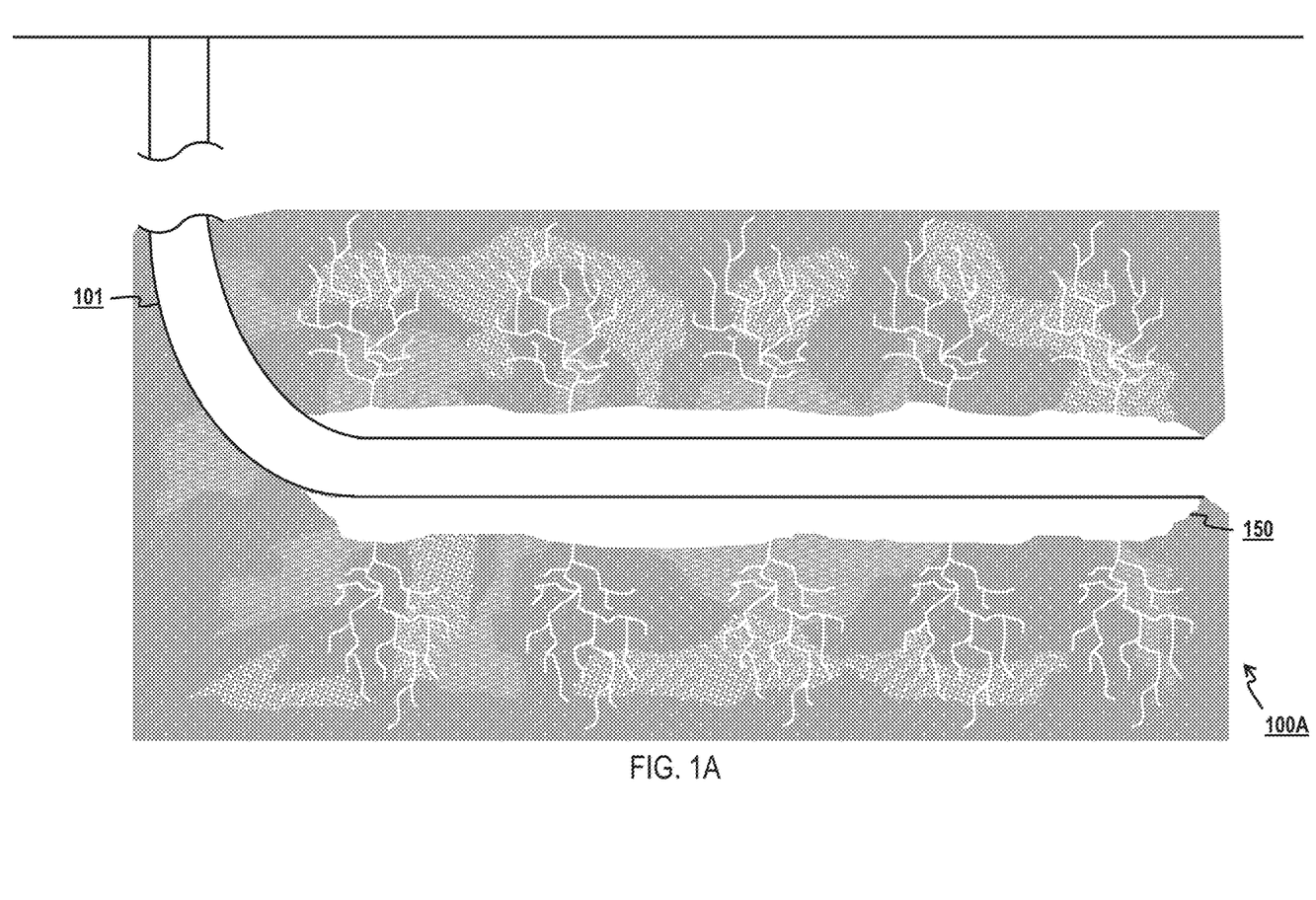
FIG. 1A is an example of a well in a fractured formation.

FIG. 1A shows a system 100A which includes a well within a wellbore formed in a subterranean zone. While the well shown in FIG. 1A is a horizontal well, the well can be vertical, angled, branched or a combination of them. The well can include or not include a production casing, liner, or tubing 101 that extends into the wellbore. In some implementations, the well can be open hole, which can be more cost effective than a cased hole. In some implementations, the well can be partially cased. The wellbore can have a surface 150, and fluid can flow from the subterranean zone into the wellbore and up to the surface through the production tubing 101. The subterranean zone can be, for example, a carbonate or sandstone formation that is fractured and has heterogeneous permeability (depicted by the various patterning in FIG. 1A) along an axial length of the wellbore. Without additional treatment, fluid inflow to the well can potentially be unevenly distributed due to the varied permeability profile of the subterranean zone.

Figure 1B:
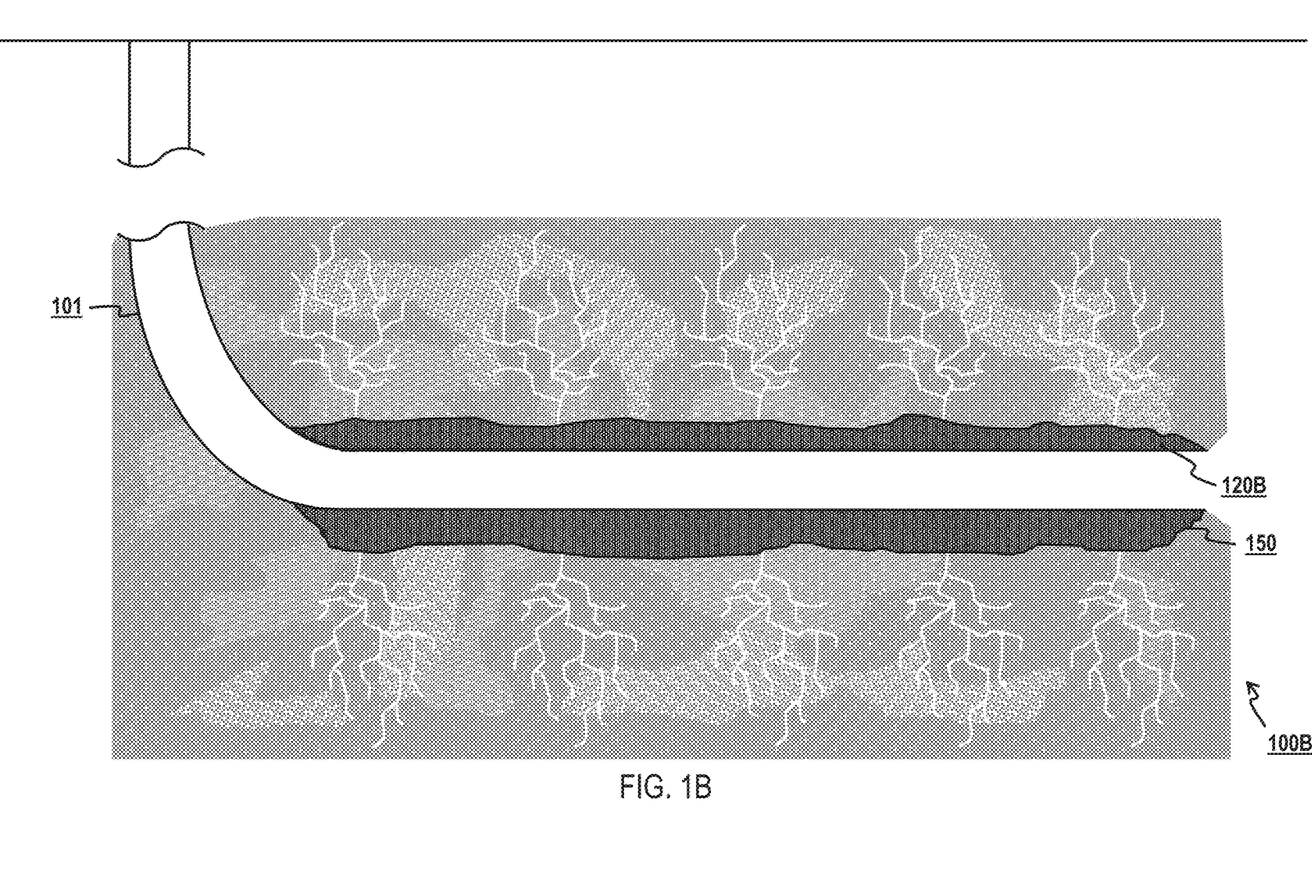
FIG. 1B is an example of the well of FIG. 1A, which includes unconsolidated material.

FIG. 1B shows a system 100B that is similar to system 100A, but includes unconsolidated material 120B. Unconsolidated material 120B can be introduced to the wellbore and can contact the surface 150 of the wellbore. For example, the unconsolidated material 120B can be pumped downhole in the form of a slurry through the well. In some implementations, the unconsolidated material 120B can travel down the well and exit the casing 101 through perforations, for example, the perforations utilized to hydraulically fracture the subterranean zone. In some implementations, the unconsolidated material 120B is pumped downhole to a targeted location through coiled tubing. The unconsolidated material 120B can contact the surface 150 of the wellbore. In some implementations, the unconsolidated material 120B at least partially fills an annulus between the surface 150 of the wellbore and the casing 101. In some implementations, both sides of a targeted axial portion of the wellbore are cemented, so that material flows only to the targeted area. As one example, for a vertical well, an uphole side and a downhole side of the targeted axial portion of the wellbore are cemented, so that material flows only to the targeted area between the two cemented sides. In some implementations, the unconsolidated material 120B can also serve as a proppant and help keep the perforations (that is, fractures) open and therefore prevent re-healing of the fractures. Unconsolidated material 120B can be a naturally occurring material or a manmade material. Examples of unconsolidated material 120B include sand, date seed material, and ceramic proppants. The unconsolidated material 120B can be made of a material that can withstand the high subsurface pressures and temperatures associated with the subterranean zone, for example, temperatures ranging between approximately 100 degrees Fahrenheit (° F.) and 400° F. and pressure ranging between approximately 1,000 pounds per square inch gauge (psig) and 10,000 psig. The size of the individual particles of the unconsolidated material 120B can be uniform or varied and can depend on a desired permeability. In turn, the desired permeability can depend on the permeability range of the target area of the subterranean zone. The particles of the unconsolidated material 120B can have any shape, such as spherical, faceted, or irregular.

A consolidation fluid that can bind the unconsolidated material can also be introduced to the wellbore. For example, the consolidation fluid can be pumped downhole through the well. In some implementations, the consolidation fluid can travel down the well and exit the casing 101 through perforations, for example, the perforations utilized to hydraulically fracture the subterranean zone. In some implementations, the consolidation fluid is pumped downhole to a targeted location through coiled tubing. The consolidation fluid can contact the unconsolidated material 120B within the wellbore. The consolidation fluid can occupy space between particles of unconsolidated material 120B. In some implementations, the consolidation fluid surrounds the particles of unconsolidated material 120B up to a distance outside the casing 101 equal to an outer diameter of the casing 101. The consolidation fluid can include a resin that is compatible with the subterranean zone and the fluids that already exist within the subterranean zone. A resin is a liquid capable of hardening and are typically viscous. An example of a suitable resin is a synthetic resin, such as an epoxy resin or a polyurethane resin. In some cases, the subsurface temperature of the subterranean zone can cause the consolidation fluid to harden—which is the case, for example, for a thermosetting polymer. A thermosetting polymer (also referred as thermosetting plastic, thermoset, or thermosetting resin) is a polymer that can be irreversibly hardened from a liquid or resin that is typically viscous prior to hardening. A thermosetting polymer can be hardened by action of heat, radiation, or by mixing with a catalyst. Curing a thermosetting resin irreversibly transforms the resin into a plastic or elastomer by crosslinking or chain extension. In this document, the term "harden" should be interpreted in a flexible manner to include any form of hardening, such as curing (in the case of a resin or polymer) or solidifying. In some cases, the consolidation fluid includes a curing agent that can cause the consolidation fluid to harden. A curing agent is a substance that causes hardening of a resin. In some cases, the resin begins to harden once the resin is in contact with the curing agent. In some cases, the resin begins to harden once it is exposed to an elevated temperature (for example, 200° F.) after the resin and the curing agent have made contact. A few examples of curing agents are cyclic anhydrides, polyphenols, polyfunctional primary amines, tertiary amines, furan, unsaturated polyester-vinylpyrrolidone, unsaturated polyester-styrene, or combinations of these. For example, the consolidation fluid can include two monomers in a copolymer with one monomer being the resin and the other monomer being the curing agent or hardener. In such cases, the two monomers can unite (that is, undergo a linking reaction) to polymerize into a hardened compound. The hardening of the consolidation fluid can consolidate (that is, connect or bind) the unconsolidated material together. In other words, the consolidation fluid can harden to form a matrix that secures, connects, or binds the unconsolidated material together. In certain implementations, the unconsolidated material 120B is introduced simultaneously with the consolidation fluid. In some implementations, the consolidation fluid is mixed with the unconsolidated material 120B at a surface location, and the mixture is introduced to the wellbore. For example, the mixture of consolidation fluid and unconsolidated material 120B can be a slurry of solids entrained in a liquid, and the slurry can be pumped downhole to a targeted location through coiled tubing. In certain implementations, the consolidation fluid is introduced to the wellbore after the unconsolidated material 120B. The well can be shut in for sufficient time to at least partially consolidate the unconsolidated material 120B with the consolidation fluid. For example, the well can be shut in for substantially 48 hours or less, so that the consolidation fluid can harden, thereby consolidating the unconsolidated material 120B. In this specification, "substantially" means a deviation or allowance of up to 10 percent (%).

Figure 1C:
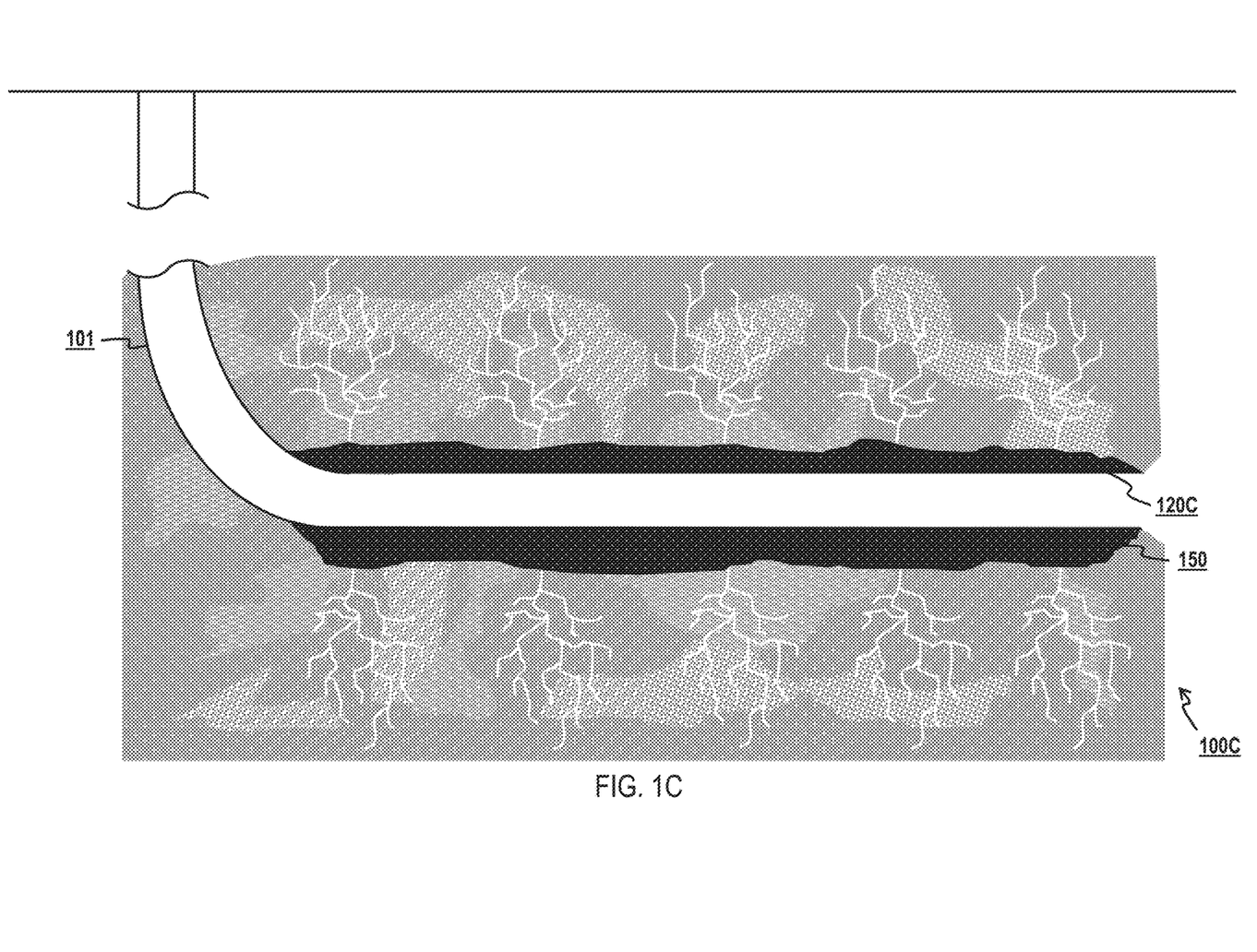
FIG. 1C is an example of the well of FIG. 1A, which includes consolidated material.

FIG. 1C shows a system 100C that is similar to system 100B, but with consolidated material 120C after the unconsolidated material 120B has been at least partially consolidated by the consolidation fluid. The consolidated material 120C can contact the surface 150 of the wellbore. The wellbore can have an inner diameter. In the case where the wellbore is completed open hole, the consolidated material 120C can have a thickness that is substantially equal to one third of the inner diameter of the wellbore or less. The amount of consolidation fluid and unconsolidated material 120B introduced to the well can depend on an estimated or desired final volume of consolidated material 120C within the wellbore after the consolidation fluid has hardened and consolidated the unconsolidated material 120B. The thickness of the consolidated material 120C can also be controlled by slotted liners that can be placed and left within the well. The consolidated material 120C can have a uniform permeability. The consolidated material 120C can have a permeability that is more uniform than the subterranean zone along an axial length of the wellbore. The consolidated material 120C can have a lower permeability than the unconsolidated material 120B.

Figure 1D:
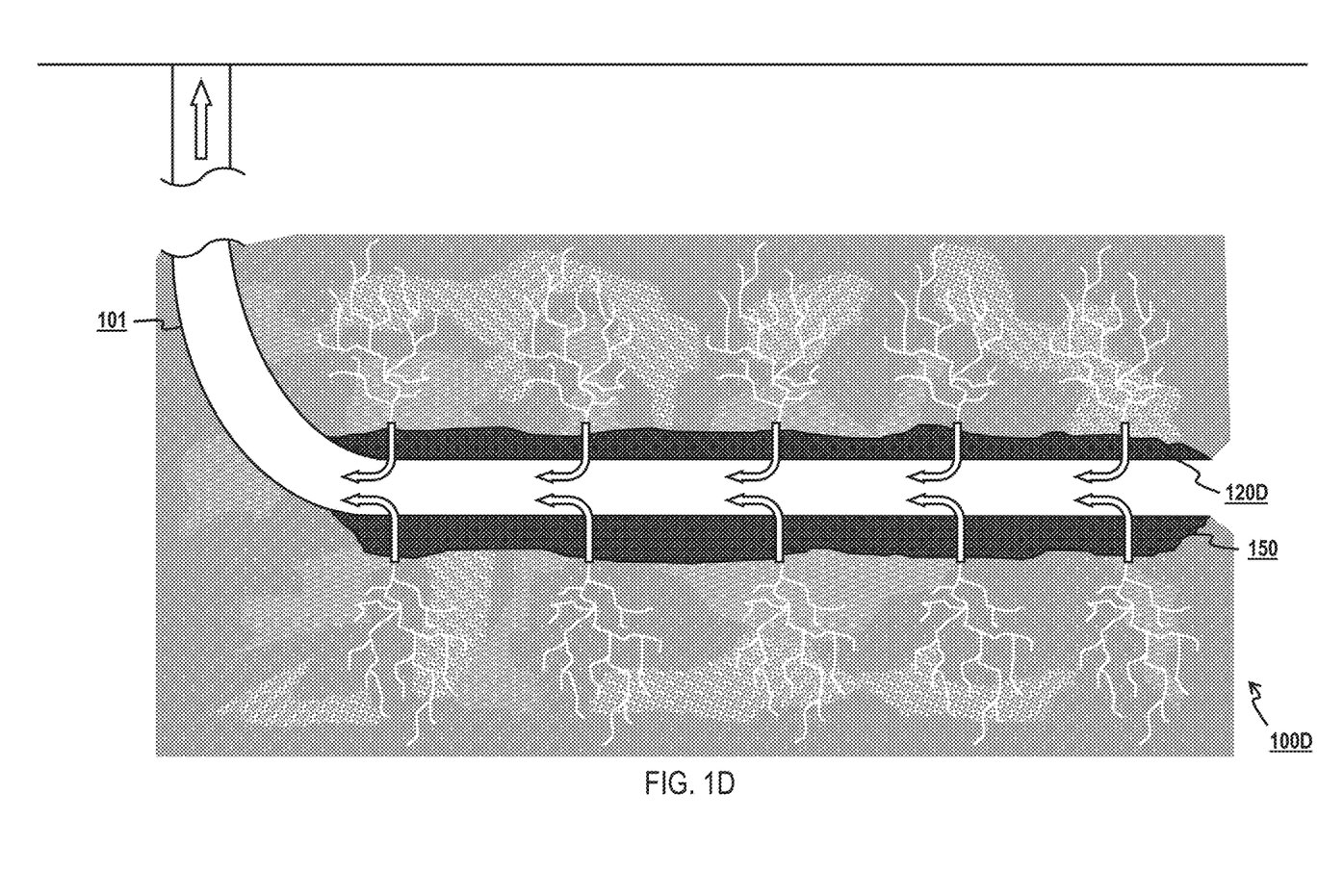
FIG. 1D is an example of the well of FIG. 1A, which includes consolidated material.

FIG. 1D shows a system 100D that is similar to system 100C, but with treated consolidated material 120D with higher permeability that the consolidated material 120C. A postflush fluid can be introduced to the wellbore. The postflush fluid can be an aqueous fluid, a solvent, or a combination of both. In certain implementations, the postflush fluid is methanol, water, or a mixture of both. The postflush fluid can contact the consolidated material 120C. In some cases, the postflush fluid dissolves any unhardened consolidation fluid. The postflush fluid can dissolve a portion of the hardened consolidated material 120C. In this way, the postflush fluid can cause the permeability of the consolidated material 120C to increase. The postflush fluid can interact with the consolidated material 120C to produce the treated consolidated material 120D with increased permeability. The amount of postflush fluid utilized can depend on the volume of unconsolidated material 120B and consolidation fluid (therefore, the volume of consolidated material 120C) introduced to the well. Increasing the amount of postflush fluid utilized can increase the permeability of the treated consolidated material 120D. The well can be shut in, so that the postflush fluid contacts the consolidated material 120C for sufficient time to increase permeability, for example, 48 hours or less. In some cases, the postflush fluid is introduced to the wellbore immediately after introducing the unconsolidated material 120B and consolidation fluid, and then the well is shut in for 48 hours or less. In certain implementations, the permeability of the treated consolidated material 120D (after postflush fluid treatment) is substantially 80% (or less) of the permeability of the unconsolidated material 120B (before consolidation). The treated consolidated material 120D after contact with the postflush fluid can have a uniform permeability (similar to the consolidated material 120C). The treated consolidated material 120D can have permeability that is more uniform than the subterranean zone along an axial length of the wellbore (similar to the consolidated material 120C). The treated consolidated material 120D can serve as a choke (that is, increase pressure drop) to regulate fluid flow into the well. Because the treated consolidated material 120D has a uniform permeability, the distribution of flow into the wellbore (and the well) can be equalized along the axial length of the wellbore. The uniform, equal distribution can delay, mitigate, or prevent such things as water breakthrough. In the case with sandstone formations, the consolidated material can also delay, mitigate, or prevent undesirable sand production. A production log can be recorded before and after the consolidation treatment. The production log can include a flow profile of fluids across the well and a percentage of flow reduction comparing before and after the consolidation treatment as a measure of choking effect that the treated consolidated material 120D provides. The production log can include a comparison of pressure build up before and after the consolidation treatment as another way to measure the choking effect of the treated consolidated material 120D. As one example, analysis of a well test can provide insight on the added layer of treated consolidated material 120D, as the treated consolidated material 120D will appear as a skin in the analysis. Although the postflush fluid increases permeability of the consolidated material 120B (which is beneficial), the postflush fluid also decreases the strength or competency of the consolidated material 120C (which is detrimental). The amount of postflush fluid introduced to the wellbore and the duration of well shut in should be carefully planned, such that the desired choking effect is achieved, while also maintaining an end product (that is, the treated consolidated material 120D) that is not prone to breaking, eroding, or ripping away from the wellbore surface when production fluids flow through the treated consolidated material 120D. The treated consolidated material 120D can be sufficiently competent (that is, strong enough) to resist erosion effects of any production fluids flowing from the subterranean zone into the wellbore, through the treated consolidated material 120D.

Figure 2:
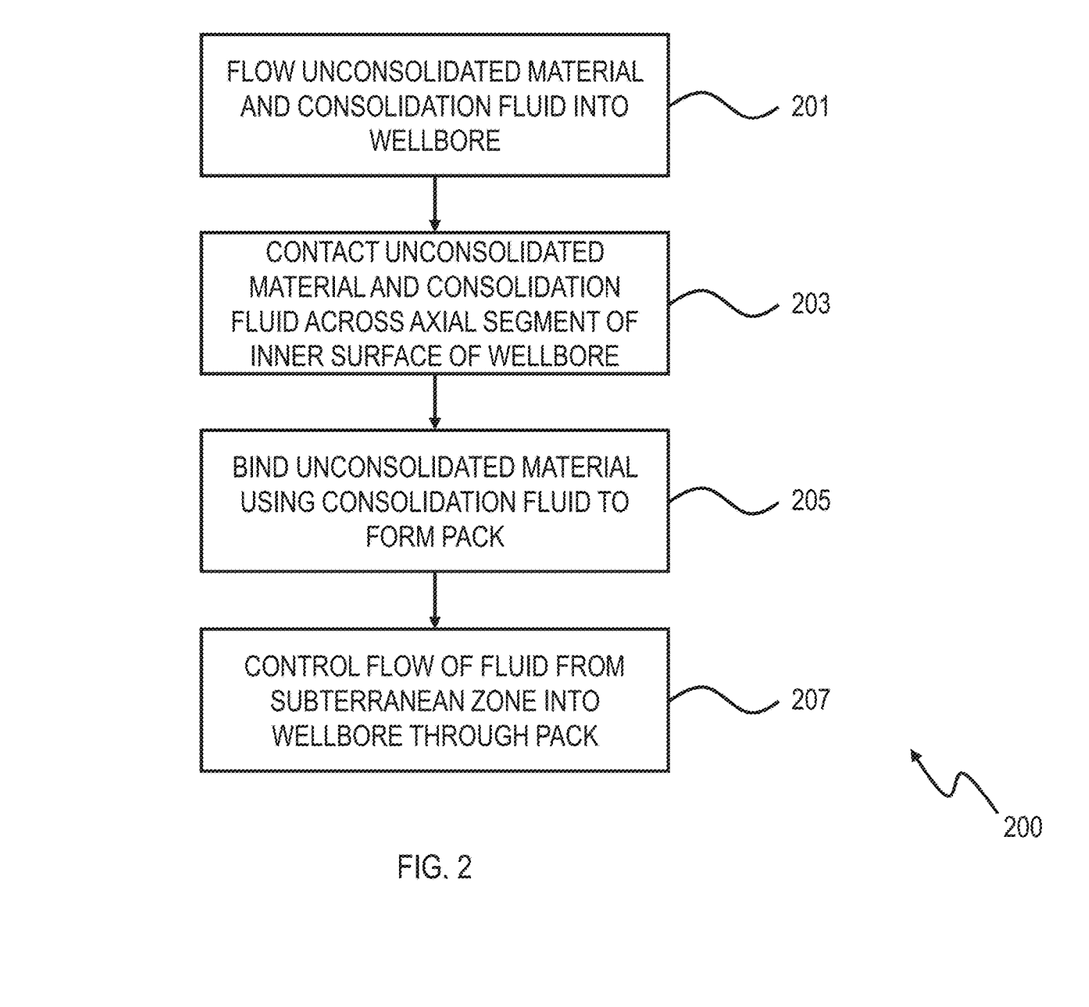
FIG. 2 is a flow chart of a method for controlling fluid flow into a wellbore.

FIG. 2 is a flow chart of a method 200 for controlling fluid flow into a wellbore. At 201, an unconsolidated material and a consolidation fluid are flowed into a wellbore formed in a hydrocarbon-bearing subterranean zone. The subterranean zone has a permeability to flow fluid through the subterranean zone into the wellbore. The permeability of the subterranean zone is non-uniform across an axial length of the wellbore. The wellbore can be vertical, horizontal, angled, branched, or a combination of them. For example, the unconsolidated material can be sand, ceramic proppants, or a combination of these materials, and the consolidation fluid can include a resin and a curing agent. In some implementations, the unconsolidated material and the consolidation fluid are mixed at a surface location to form a slurry before being flowed into the wellbore. Before the unconsolidated material and the consolidation fluid is flowed into the wellbore (201), the subterranean zone can be pre-flushed, for example, with diesel to mobilize fluids such as oil or water away from the wellbore into the formation, so that these fluids do not affect or interfere with the pack.

At 203, the unconsolidated material and the consolidation fluid are contacted across at least an axial segment of an inner surface of the wellbore. The production casing within the wellbore can have an outer diameter. The unconsolidated material and the consolidation fluid that are contacted across the axial segment of the inner surface of the wellbore can have a thickness that is substantially half the outer diameter of the casing or less.

At 205, the consolidation fluid binds the unconsolidated material to form a pack. The pack has a permeability that is more uniform than the permeability of the subterranean zone, for example, the matrix permeability of the formation. In some cases, the pack is contacted with a postflush fluid to increase the permeability of the pack. The postflush fluid can include an aqueous fluid, a solvent, or a combination of both. In certain implementations, the postflush fluid is methanol, water, or a combination of both. The pack can be contacted with the postflush fluid and can be left to harden for substantially 48 hours or less. After the pack is contacted with the postflush, the permeability of the pack can be substantially 80% (or less) of the original permeability of the unconsolidated material.

At 207, a flow of fluids from the axial segment of the subterranean zone into the wellbore is controlled through the pack. Because the pack has a uniform permeability, the pack can serve as a choke, thereby equalizing the flow of fluids from the subterranean formation into the wellbore along a length of the wellbore. Without the pack (or other device to equalize inflow), the heterogeneous (that is, non-uniform) permeability of the subterranean zone can cause flow to preferentially flow through higher permeability areas along the wellbore, meaning some areas of the wellbore may experience higher inflow rates in comparison to other areas with lower permeability, which can lead to undesirable premature water breakthrough.

Figure 3:
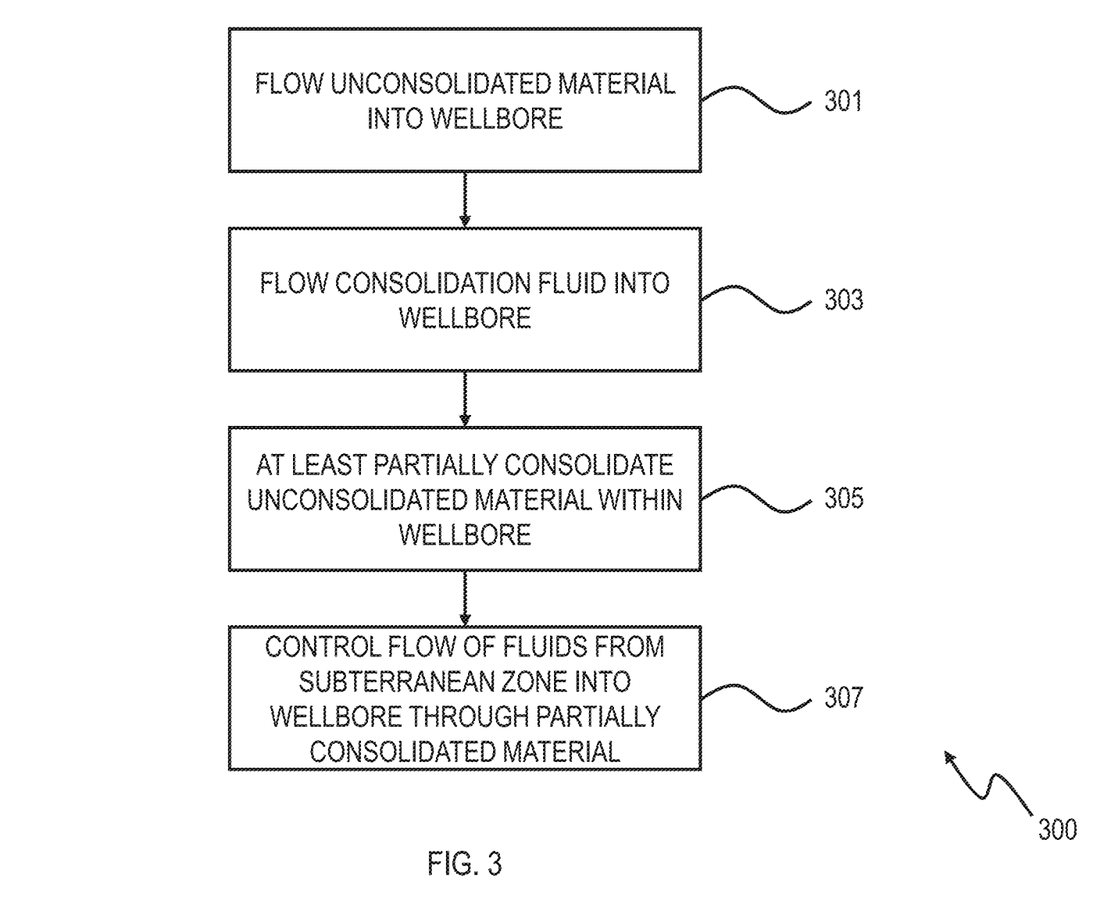
FIG. 3 is a flow chart of a method for controlling fluid flow into a wellbore.

FIG. 3 is a flow chart of a method 300 for controlling fluid flow into a wellbore. At 301, an unconsolidated material is flowed into a wellbore formed in a hydrocarbon-bearing subterranean zone. The subterranean zone has a permeability to flow fluid through the subterranean zone into the wellbore. The permeability of the subterranean zone varies across an axial length of the wellbore. Similar to method 200, the unconsolidated material can be sand, ceramic proppants, or a combination of these materials.

At 303, a consolidation fluid is flowed into the wellbore. The consolidation fluid and the unconsolidated material can be flowed together into the wellbore (in other words, 301 and 303 can occur simultaneously). For example, the consolidation fluid and the unconsolidated material can be flowed into the wellbore at the same time. As another example, the consolidation fluid and the unconsolidated material can be mixed to form a slurry, and the slurry of the consolidation fluid and the unconsolidated material can be flowed into the wellbore. In certain implementations, the consolidation fluid is flowed into the wellbore after flowing the unconsolidated material into the wellbore (in other words, 303 occurs after 301). The consolidation fluid and the unconsolidated material can be pumped downhole into the wellbore, for example, as a slurry.

At 305, the unconsolidated material is at least partially consolidated within the wellbore using the consolidating fluid to form an at least partially consolidated material. Consolidating the unconsolidated material using the consolidating fluid can involve connecting or binding the unconsolidated material together to form a larger, consolidated mass. Similar to method 200, the consolidation fluid can include a resin and a curing agent. The consolidated material has a permeability that is different from the permeability of the subterranean zone, and the partially consolidated material coats an inner wall of an axial segment of the wellbore. The consolidated material can have a permeability that is more uniform than the permeability of the subterranean zone surrounding the wellbore. In certain implementations, the at least partially consolidated material is contacted with a postflush fluid to increase the permeability of the at least partially consolidated material. The postflush fluid can include an aqueous fluid, a solvent, or a combination of both. In certain implementations, the postflush fluid is methanol, water, or a combination of both. The at least partially consolidated material can be left to harden for substantially 48 hours or less to continue hardening after the postflush treatment. After the at least partially consolidated material is contacted with the postflush fluid, the permeability of the at least partially consolidated material can be substantially 80% (or less) of the original permeability of the unconsolidated material.

At 307, a flow of fluids from the axial segment of the subterranean zone into the wellbore is controlled through the at least partially consolidated material. The at least partially consolidated material can have a uniform permeability and can serve as a choke, thereby equalizing the flow of fluids from the subterranean formation into the wellbore along a length of the wellbore. Without the partially consolidated material (or other device to equalize inflow), the heterogeneous (that is, non-uniform) permeability of the subterranean zone can cause flow to preferentially flow through higher permeability areas along the wellbore, meaning some areas of the wellbore may experience higher inflow rates in comparison to other areas with lower permeability, which can lead to undesirable premature water breakthrough.

EXAMPLE

Experiments were conducted on loose sand (unconsolidated material) collected from Unayzah formation. The sand was consolidated with a resin including a curing agent (EXPEDITE® A&B by Halliburton Energy Services, Inc.) and flushed with a methanol solvent (postflush fluid) to increase permeability. The sand was packed into a plug-like core holder and was flooded with the resin (that is, the resin was injected at one end of the sand pack such that the resin floods and flows through the sand pack) under reservoir conditions (3,500 psig and 194° F.) to simulate downhole conditions of injecting the resin into a sandstone formation to stabilize the formation. The methanol solvent was pure methanol, and at least two pore volumes were injected through the consolidated sand core. The result was a mechanically competent sand pack with a permeability of nearly 70% of the original permeability of the loose sand. Core flooding tests were conducted on the consolidated sand pack. Throughout the tests, a temperature of substantially 194° F. and a pressure of substantially 3,500 psig were maintained to simulate subterranean reservoir conditions.

Prior to resin treatment, the sand pack was pre-flushed with diesel at a rate of 3 cubic centimeters per minute (cc/min) for at least two pore volumes. An initial permeability of the loose sand pack to a synthetic brine solution of 3% potassium chloride (KCl) was measured. Permeability was calculated per Darcy's law:

$$k = \frac{Q\mu L}{(P_u - P_d)A},$$

where k is permeability, Q is the fluid injection rate through the sand pack, $\mu$ is the viscosity of the injected fluid (brine), L is the length of the sand pack, $P_u$ is the pressure upstream of the sand pack, $P_d$ is the pressure downstream of the sand pack, and A is the cross-sectional area of the sand pack (perpendicular to the direction of injected flow). The permeability was measured at multiple injection rates varying from approximately 3 cc/min to approximately 6 cc/min for at least two pore volumes. The permeability of the loose sand pack stabilized between approximately 50 mD to approximately 55 mD.

The sand pack was then consolidated with the resin, followed by a postflush treatment of methanol. The sand pack was then shut in for 48 hours at approximately 194° F. After the shut in, the permeability of the consolidated sand pack (treated with postflush fluid to increase permeability) was measured over 7 days of continuous brine injection (the same brine solution used previously in measuring the permeability of the loose sand pack) at approximately 3 cc/min to 6 cc/min. The average permeability was maintained at approximately 35 mD, which is approximately 70% of the original permeability of the loose (that is, unconsolidated) sand pack.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example implementations do not define or constrain this disclosure. Other changes, substitutions, and alterations are also possible without departing from the spirit and scope of this disclosure.

What is claimed is:

1. A method comprising:
    flowing an unconsolidated material and a consolidation fluid into a wellbore formed in a hydrocarbon-bearing subterranean zone, wherein a permeability of the subterranean zone to flow fluid through the subterranean zone into the wellbore is non-uniform across an axial length of the wellbore;
    contacting the unconsolidated material and the consolidation fluid across at least an axial segment of an inner surface of the wellbore;
    binding the unconsolidated material with the consolidation fluid to form a pack, the pack having a permeability more uniform than the permeability of the subterranean zone;
    after binding the unconsolidated material with the consolidation fluid, dissolving at least a portion of the pack with a postflush fluid to increase permeability of the pack; and
    after dissolving at least a portion of the pack with the postflush fluid, equalizing a flow of fluids from the axial segment of the subterranean zone into the wellbore through the pack.

2. The method of claim 1, wherein the consolidation fluid comprises a resin and a curing agent.

3. The method of claim 1, wherein the unconsolidated material comprises sand, ceramic proppants, or combinations thereof.

4. The method of claim 3, wherein the consolidation fluid binds the unconsolidated material after contacting the pack across at least the axial segment of the inner surface of the wellbore.

5. The method of claim 4, further comprising contacting the pack with a postflush fluid to increase the permeability of the pack after contacting the pack across at least the axial segment of the inner surface of the wellbore.

6. The method of claim 5, wherein the postflush fluid comprises an aqueous fluid, a solvent, or combinations thereof.

7. The method of claim 6, wherein the postflush fluid comprises methanol, water, or combinations thereof.

8. The method of claim 6, wherein the pack is left to harden for substantially 48 hours or less after contacting the pack with the postflush fluid.

9. The method of claim 6, wherein the permeability of the pack after contacting the pack with the postflush fluid is substantially 80% or less of a permeability of the unconsolidated material.

10. A method for completing a well, the method comprising:
    flowing an unconsolidated material into a wellbore formed in a hydrocarbon-bearing subterranean zone, wherein a permeability of the subterranean zone to flow fluid through the subterranean zone into the wellbore varies across an axial length of the wellbore;
    flowing a consolidation fluid into the wellbore;
    at least partially consolidating the unconsolidated material within the wellbore using the consolidating fluid to form an at least partially consolidated material having a permeability that is different from the permeability of the subterranean zone, wherein the at least partially consolidated material coats an inner wall of an axial segment of the wellbore;
    after at least partially consolidating the unconsolidated material, dissolving at least a portion of the at least partially consolidated material to increase permeability of the at least partially consolidated material; and
    after dissolving the portion of the at least partially consolidated material, equalizing a flow of fluids from the axial segment of the subterranean zone into the wellbore through the at least partially consolidated material.

11. The method of claim 10, wherein the consolidation fluid comprises a resin and a curing agent.

12. The method of claim 10, wherein the unconsolidated material comprises sand, ceramic proppants, or combinations thereof.

13. The method of claim 12, wherein the consolidation fluid and the unconsolidated material are flowed together into the wellbore.

14. The method of claim 12, wherein the consolidation fluid is flowed into the wellbore after flowing the unconsolidated material into the wellbore.

15. The method of claim 12, further comprising contacting the at least partially consolidated material with a postflush fluid to increase the permeability of the at least partially consolidated material.

16. The method of claim 15, wherein the postflush fluid comprises an aqueous fluid, a solvent, or combinations thereof.

17. The method of claim 16, wherein the postflush fluid comprises methanol, water, or combinations thereof.

18. The method of claim 16, wherein the at least partially consolidated material is contacted with the postflush fluid to increase permeability, and the at least partially consolidated material is left to harden for substantially 48 hours or less.

19. The method of claim 16, wherein the permeability of the at least partially consolidated material after contacting the at least partially consolidated material with the postflush fluid is substantially 80% or less of a permeability of the unconsolidated material.

* * * * *